United States Patent [19]

Tortorich

[11] Patent Number: 4,944,340

[45] Date of Patent: Jul. 31, 1990

[54] AERODYNAMIC BICYCLE COVER

[76] Inventor: Rainey Tortorich, 1755 Whispering Oaks, Ogden, Utah 84403

[21] Appl. No.: 410,648

[22] Filed: Sep. 21, 1989

[51] Int. Cl.$^5$ .............................................. B60R 9/10
[52] U.S. Cl. .................................. 150/167; 206/335; 224/42.03 B; 296/78.1; 296/136
[58] Field of Search ................ 150/166, 167; 206/335; 296/78.1, 136; 224/42.03 A, 42.03 B

[56] References Cited

U.S. PATENT DOCUMENTS

| | | | |
|---|---|---|---|
| 2,787,311 | 4/1957 | Cohen et al. | 296/136 X |
| 3,659,872 | 5/1972 | Warner | 296/78.1 X |
| 3,665,515 | 5/1972 | Sjostrom, Sr. | 296/78.1 X |
| 3,884,523 | 5/1975 | Allen | 296/136 |
| 3,886,988 | 6/1975 | Garrett et al. | 150/52 R |
| 3,968,913 | 7/1976 | Weed et al. | 150/167 X |
| 3,972,539 | 8/1976 | Mize | 296/78.1 |
| 4,009,744 | 3/1977 | Joslyn | 150/167 |
| 4,283,084 | 8/1981 | Gallagher | 296/78.1 |
| 4,356,831 | 11/1982 | Adams | 150/167 |
| 4,378,883 | 4/1983 | Profeta | 150/167 X |
| 4,598,725 | 7/1986 | Brewer | 135/30 |
| 4,715,646 | 12/1987 | Goffi et al. | 150/167 X |
| 4,756,416 | 7/1988 | Johnson | 206/335 |

FOREIGN PATENT DOCUMENTS

| | | | |
|---|---|---|---|
| 13531 | 4/1956 | Fed. Rep. of Germany | 150/167 |
| 3526208 | 1/1987 | Fed. Rep. of Germany | 296/78.1 |
| 2434076 | 4/1980 | France | 296/136 |
| 2476583 | 8/1981 | France | 206/335 |
| 25592 | of 1898 | United Kingdom | 296/78.1 |
| 785039 | 10/1957 | United Kingdom | 296/136 |

Primary Examiner—Sue A. Weaver
Attorney, Agent, or Firm—Workman, Nydegger & Jensen

[57] ABSTRACT

A unique travel and storage cover for covering wheeled vehicles, such as bicycles. The present invention discloses such a cover that form fits a wheeled vehicle and is sufficiently aerodynamic that the cover can be used when transporting the bicycle by motor vehicle. The cover is constructed such that it fits tightly around the wheels, pedals, frame, handle bars, and seat of the bicycle. The cover may be constructed in one piece. Alternatively, a separate seat cover may be provided such that the seat is tightly covered. Alternatively, the cover may comprise multiple pieces, each designed for covering a particular component of the vehicle.

The cover is provided with zippers, VELCRO, or other suitable means of attachment at all locations comprising openings in the cover. This allows the bicycle or other vehicle to be easily placed inside the cover. Once inside the cover, the cover is secured by closing the zipper or zippers. This provides a tight, form fit which holds the cover snugly about the bicycle.

The cover may be provided with one or more sections of mesh. These mesh sections are positioned over openings in the frame of the bicycle or over the wheels, i.e. any place within the silhouette of the bicycle which does not comprise an actual part of the bicycle. The mesh allows air to pass through the bicycle and cover such that flapping of the cover is minimized. As an alternative, the mesh could be eliminated and on opening could remain.

20 Claims, 2 Drawing Sheets

AERODYNAMIC BICYCLE COVER

BACKGROUND

1. Field of the Invention

The present invention relates to a protective cover for use with a wheeled vehicle such as a bicycle. More particularly, the present invention relates to a protective cover which is also aerodynamic in design such that it can be used to cover a bicycle placed in an automobile bicycle rack.

2. Background of the Invention

The sport of cycling has gained a very substantial following in recent years. The general population is becoming increasingly health conscious. Aerobic exercise as become a regular part of the daily routine of many people. One of the problems that is encountered in any exercise program, however, is designing a program that is also enjoyable. Many people find running, aerobic dance, and related activities to be monotonous, boring, and physically difficult. For example, some people find it difficult to keep up an aerobic exercise program because of injuries to joints, sore muscles, torn ligaments, and similar ailments.

Many people have found bicycling to be an answer to the problems otherwise encountered in aerobic exercise. Bicycling is often found to be more enjoyable and less physically stressful. As a result, the sport of bicycling has found an increased following among those seeking an enjoyable and effective means of aerobic exercise.

In addition, the sport of bicycling has recently expanded in several additional respects. In particular, the mountain bike is a recent development that has become very popular. Mountain bikes can be used to access terrain that was previously only accessible by foot or possibly four wheel drive vehicle. Thus, bicycling has expanded into an area previously dominated by hikers and off road vehicle enthusiasts.

Bicycles have also been the subject of a number of technical advancements in recent years. One area in which these advancements has been felt is in the area of touring bicycles. These bicycles have become lighter and more functional. As a result, the popularity of touring by bicycle, as opposed to using a motor vehicle, has also seen a significant increase.

One of the results of the development of cycling, and its various specialized areas such as bicycle touring and mountain biking, has been the need to transport bicycles by motor vehicle on a much more frequent basis. For example, if a person wishes to tour a national park using a touring or mountain bicycle, it is often necessary to transport the bicycle hundreds of miles before the use of the bicycle begins. In addition, if a person is traveling and still wishes to have access to a bicycle for the purposes of aerobic exercise, it is also necessary to transport the bicycle. Thus, the need for adequate means for transporting bicycles has increased with the increased popularity of the activity.

When transporting a bicycle by a conventional private automobile, van or the like, it is not usually possible to place the bicycle inside the motor vehicle because of its size and configuration. As a result, two common types of bicycle racks are generally encountered in the transportation of bicycles on the outside of the vehicle. These racks include roof racks and racks which attach to the rear of the vehicle.

Roof racks, as their name would suggest, attach to the roof of the motor vehicle. The bicycle is then placed on top of the vehicle, often in an inverted position. An alternative type of conventional roof rack requires the removal of the front wheel of the bicycle so that the front forks can be used to attached the bicycle to the rack.

Racks attached to the rear of the automobile generally provide two outwardly protruding arms. The bicycle is then hung on the outwardly protruding arms. With this type of rack, it is often possible to attach two or more bicycles to the rack. However, an additional problem is created in that the multiple bicycles interfere with one another. It is often observed that the pedals of one bicycle become entangled in the spokes of the other bicycles, occasionally resulting in damage to the bicycles. Accordingly, it would be very desirable to provide a protective cover for each individual bicycle so that damage caused by interaction between bicycles could be avoided.

With the use of either type of rack, the bicycle is exposed to the elements as it is being transported. To aggravate the situation, the bicycle is also exposed to a high degree of air flow associated with the speed of travel of the vehicle. This exposure can result, for example, in the bicycle being struck by gravel and debris, as well as rain, snow and other types of natural precipitation. It will be appreciated that this exposure can damage expensive bicycles and their components.

As a result of the desire to remove bicycles from exposure to the elements, protective covers have been developed. However, none of the covers has been able to adequately protect a bicycle mounted on a motor vehicle rack because of problems associated with the speed of travel of the motor vehicle.

For example, protective bags have been developed. These bags are generally large, bulky containers made of some type of flexible, yet durable material, such as a plastic or canvass material. These bags cover the bicycle and protect it from the elements. However, there is generally no significant effort made to fit the bag precisely to the contour of the bicycle. Indeed, bags of this type could be used to cover any vehicle or object of the approximate size of a bicycle.

A primary limitation of such bags is that they are not form fit to the shape of a bicycle. As a result, it is not practical to use the bags when transporting a bicycle on a motor vehicle because the bag tends to flap violently in the wind as the motor vehicle reaches highway speeds. This can result in damage to the bag, damage to the bicycle, or extreme annoyance. For this reason, there have been few attempts to cover bicycles mounted to roof racks.

Some additional attempts have been made to make bicycle covers for use with bicycles mounted to racks mounted to the rear of an automobile. These covers are shaped generally in the form of an envelope of sufficient size to cover the bicycle. Such covers may also provide means for the rack to penetrate the cover and support the bicycle. Again, however, these types of devices have not included any serious attempt to form fit the cover to the bicycle. Nor has there been any serious attempt to make such covers aerodynamic in nature. As a result, these types of covers also have a serious tendency to flap in the air as the automobile reaches higher speeds.

Accordingly, it would be an advancement in the art to provide a travel and storage cover for bicycles which overcame the limitations encountered in existing covers. More particularly, it would be a major advancement in the art to provide a bicycle travel and storage cover which was sufficiently aerodynamic when covering the bicycle that it could be used when transporting a bicycle mounted to an automobile bicycle rack. Similarly, it would be an advancement in the art to provide such a cover which form fit the bicycle such that the bicycle could be mounted to an automobile roof rack without undue flapping of the cover in the air at highway speeds. It would also be an advancement in the art to provide a bicycle travel cover which could optionally allow air to pass through a portion of the cover as the bicycle is being transported.

Such and apparatus is disclosed and claimed below.

BRIEF SUMMARY AND OBJECTS OF THE INVENTION

The present invention relates to a unique travel and storage cover for covering wheeled vehicles, such as bicycles. More particularly, the present invention discloses such a cover that form fits a wheeled vehicle and is sufficiently aerodynamic that the cover can be used when transporting the bicycle by motor vehicle.

In one embodiment, the present invention provides an aerodynamic travel and storage cover which provides excellent protection for the bicycle or other wheeled vehicle. The cover is constructed such that it fits tightly around the wheels, pedals, frame, handle bars, and seat of the bicycle. The cover may be constructed in one piece. Alternatively, a separate seat cover may be provided such that the seat is tightly covered. In an alternative embodiment, the cover may comprise multiple pieces, each designed for covering a particular component of the vehicle.

The cover is provided with zippers, VELCRO, or other suitable means of attachment at all locations comprising openings in the cover. For example, it is desirable in one embodiment of the device to provide zippers around at least a portion of the device which covers the wheels. This allows the bicycle or other vehicle to be easily placed inside the cover. Once inside the cover, the cover is secured by closing the zipper or zippers. This provides a tight, form fit which holds the cover snugly about the bicycle.

The cover may be provided with one or more sections of mesh. These mesh sections are positioned over openings in the frame of the bicycle or over the wheels, i.e. any place within the silhouette of the bicycle which does not comprise an actual part of the bicycle. The mesh allows air to pass through the bicycle and cover such that flapping of the cover is minimized. As an alternative, the mesh could be eliminated and an opening could remain.

The travel and storage cover of the present invention can be constructed of any suitable material. Plastics or fabrics which are flexible, yet durable are suitable for the construction of the cover. In addition, it may be desirable to construct some or all of the cover of an elastic material or fabric (such as Spandex) such that a secure and snug fit is obtained.

It is found that a device of this nature solves the problems encountered with existing covers. The present invention allows the bicycle or other vehicle to be covered in a form fit manner. Thus, the cover and the bicycle are sufficiently aerodynamic that they can be mounted on a motor vehicle rack and be transported without incident.

Accordingly, it is a primary object of the present invention to provide a travel and storage cover for a bicycle or other similar type of vehicle which overcomes the problems encountered with existing covers.

More particularly, it is an object of the present invention to provide a travel or storage cover which form fits the vehicle covered.

It is a related object of the present invention to provide such a cover which is generally aerodynamic when attached to a motor vehicle rack.

It is also an object of the present invention to provide a travel and storage cover which may optionally provide means for allowing air to pass through at least a portion of the cover.

These and other objects of the invention will become apparent upon reading the following detailed description and appended claims, and upon reference to the accompanying drawings.

DETAILED DESCRIPTION OF THE PREFERRED EMBODIMENTS

The present invention can be more fully understood with reference to the drawings where like parts are designated with like numerals throughout. The present invention is related to a unique aerodynamic cover for use in covering a bicycle or other similar type of light wheeled vehicle. Other types of wheeled vehicles could include, for example, unicycles, tandem bicycles, baby strollers, motor scooters, small motorcycles, and the like.

Figure 1:
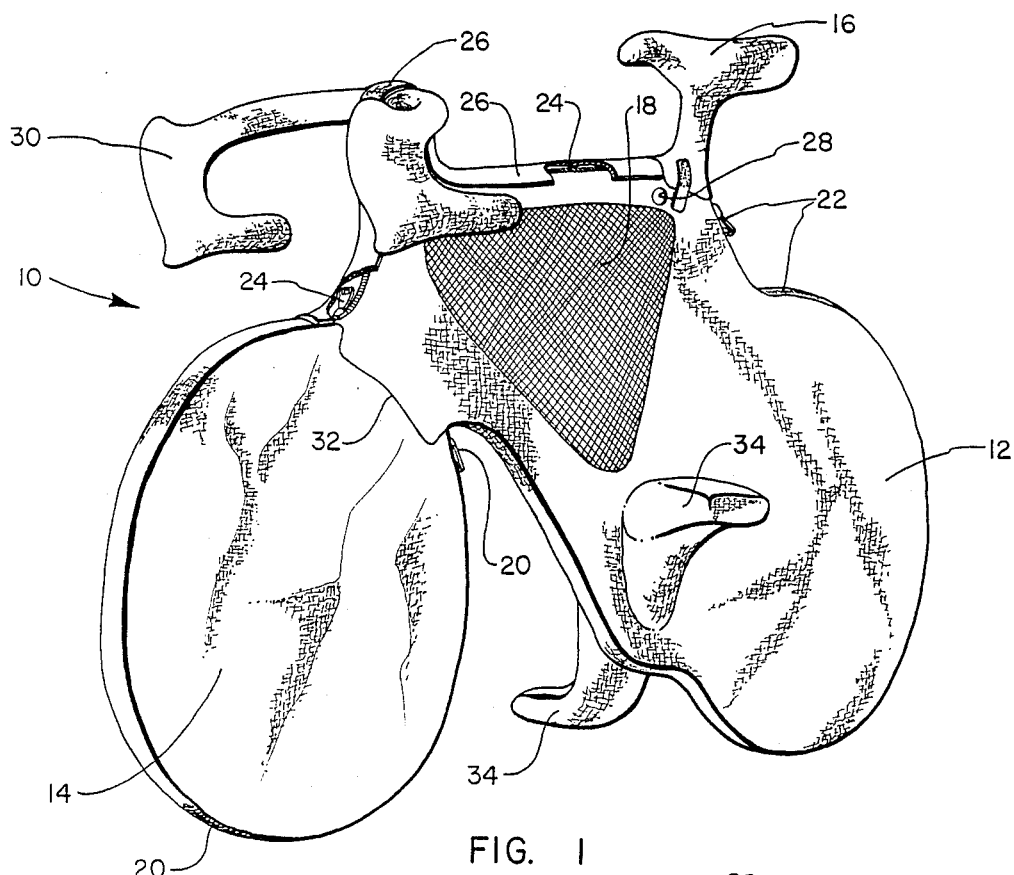
FIG. 1 is a side perspective view of one embodiment of the bicycle cover of the present invention.

Referring more particularly to FIG. 1, one embodiment of the present invention is illustrated and generally designated 10. The aerodynamic cover of the present invention may be constructed of any material which allows the invention to function as a protective cover. Such a material should preferably be relatively light weight and flexible, while at the same time being durable. Such materials include numerous types of plastics, natural fabrics, and synthetic fabrics. In addition, as will be discussed in additional detail below, the cover, or parts thereof, may be constructed of elastic materials in order to facilitate a tight form fit of the cover over the bicycle.

The cover 10 is shown in FIG. 1 in place covering a bicycle. As can be appreciated from FIG. 1, the cover 10 is able to cover the seat, handle bars, frame, wheels, pedals and other parts of the bicycle such that the bicycle can be transported. Transportation can take place without the risk of damage or annoyance due to flapping of the cover.

The cover illustrated in FIG. 1 is comprised of three (3) separate pieces. These pieces include a main body 12 of the cover 10, a front wheel section 14, which is specifically configured such that it snugly covers the bicycle's front wheel, and a seat cover 16. These parts cooperate such that the bicycle and all of its component parts are covered. These pieces allow the cover to be used with most types of bicycles. At the same time, these pieces allow the bicycle to be mounted on most types of conventional bicycle racks.

It will be appreciated that, alternatively, the cover could be constructed as a single piece, or could comprise additional pieces, such as separate pedal covers, handle bar covers and the like. It is found, however, that with the three-piece embodiment illustrated, the bicycle can be easily and conveniently covered and then transported.

An additional feature of the present invention is the ability to provide air flow through the cover. This is accomplished by placing mesh at various locations in the cover. For example, as illustrated in FIG. 1, mesh 18 is placed in the center of the cover in the area circumscribed by the frame of the bicycle. It will be appreciated that additional mesh could be placed at any location on the cover which corresponds to an opening in the structure of the wheeled vehicle. The mesh allows significant air flow through the cover, while at the same time covering and protecting a bicycle or other similar vehicle mounted to a motor vehicle rack. Thus, significant flapping of the cover of the type encountered with existing covers is avoided.

The cover is secured about the bicycle with the use of means for securing the cover. For example, the cover may be closed using zippers, VELCRO, or other types of fasteners. As illustrated in FIG. 1, the cover comprises three (3) zippers. The first zipper 20 is located on the front wheel cover 14. The zipper 20 circumscribes a sufficient portion of the diameter of front wheel cover 14 to allow the front wheel to be easily placed within the front wheel cover 14.

The second zipper 22 circumscribes a portion of the diameter of the rear wheel. In the illustrated embodiment, the zipper 22 begins a few inches above the point where the wheel would contact the ground and continues around the rear of the wheel until it approximates the rear of the bicycle seat post. Thus, the rear portion of the bicycle can be easily and securely covered and secured.

The third zipper 24 travels along the upper bar of the frame of the bicycle from the area of the seat post to the approximate location of the handle bars. The body 12 may fold over the top of the upper bar such that a flap 26 is created. It is often preferable to configure the flap 26 and locate the zipper 24 in such a manner that two support members 28 of a conventional bicycle rack can cover through openings 28 as shown. This also requires appropriately located openings on the opposite side of the cover 10. Thus, the cover 10 can be used to cover a bicycle mounted in either a roof rack or a rear mounted rack.

As illustrated in FIG. 1, the cover 10 also includes a properly configured portion to cover the handle bars. This portion is designated 30 in FIG. 1. This section of the cover 10 could be separate from the body 12, or as illustrated in FIG. 1, comprise a portion of the body 12.

The cover 10 also comprises a separate seat cover 16. This cover is configured such that it securely covers the seat and may be constructed of an elastic material to facilitate holding seat cover 16 in place. In addition, seat cover 16 may be attached to the body 12 of the cover 10 using VELCRO, snaps, an additional zipper or other fastening means.

The body of the cover 10 may also preferably include a hood 32. Hood 32 simply assures that the front forks and front wheel are fully covered and protected. Hood 32 is constructed such that water and debris do not contact the bicycle through the seam between the front wheel cover 14 and the body 12.

The cover 10 preferably also includes a pair of pedal bags 34. These pedal bags 34 are an appropriately configured for covering the pedals of the bicycle. Such bags may be constructed of a material different from the remainder of the body 12 which may be more durable and at the same time more elastic, in order to facilitate loading the bicycle into the cover and form fitting the cover 10 to the bicycle.

Figure 2:
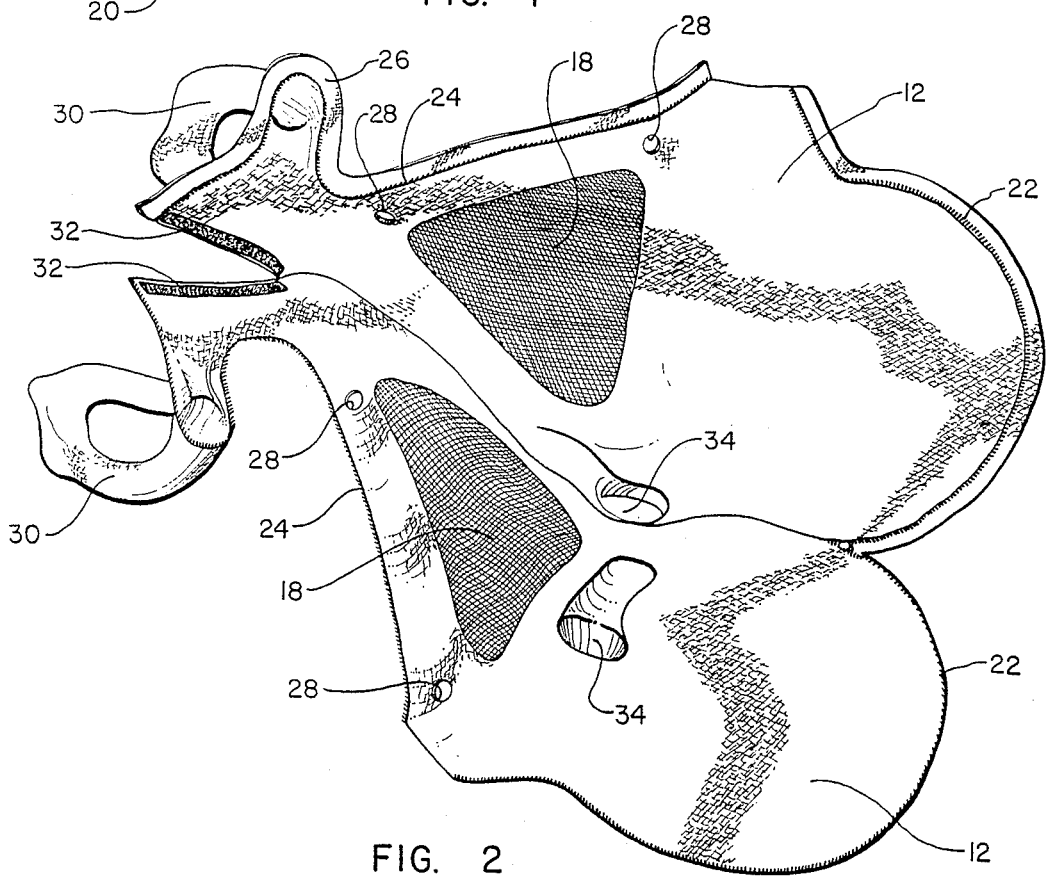
FIG. 2 is a top perspective view of the bicycle cover of FIG. 1 illustrating the cover in the open configuration.

The method of load a bicycle into the cover 10 can be more fully appreciated with reference to FIG. 2. FIG. 2 is a top perspective view of the body 12 of the cover 10 with the zippers 22 and 24 opened, and with the bag folded open. It will be appreciated from FIG. 2 that it is a simple matter to roll the bicycle into the center of the bag and then place the pedals in the pedal bags 34. Once this is accomplished the second zipper 22, which circumscribes the rear wheel, is closed. This operation is followed by closure of the third zipper 24. Once the body 12 is fully covered, the front wheel cover 14 (not shown in FIG. 2) is placed over the front wheel and the seat is covered with the seat cover 16 (not shown in FIG. 2). This results in a fully covered and transportable bicycle.

Figure 3:
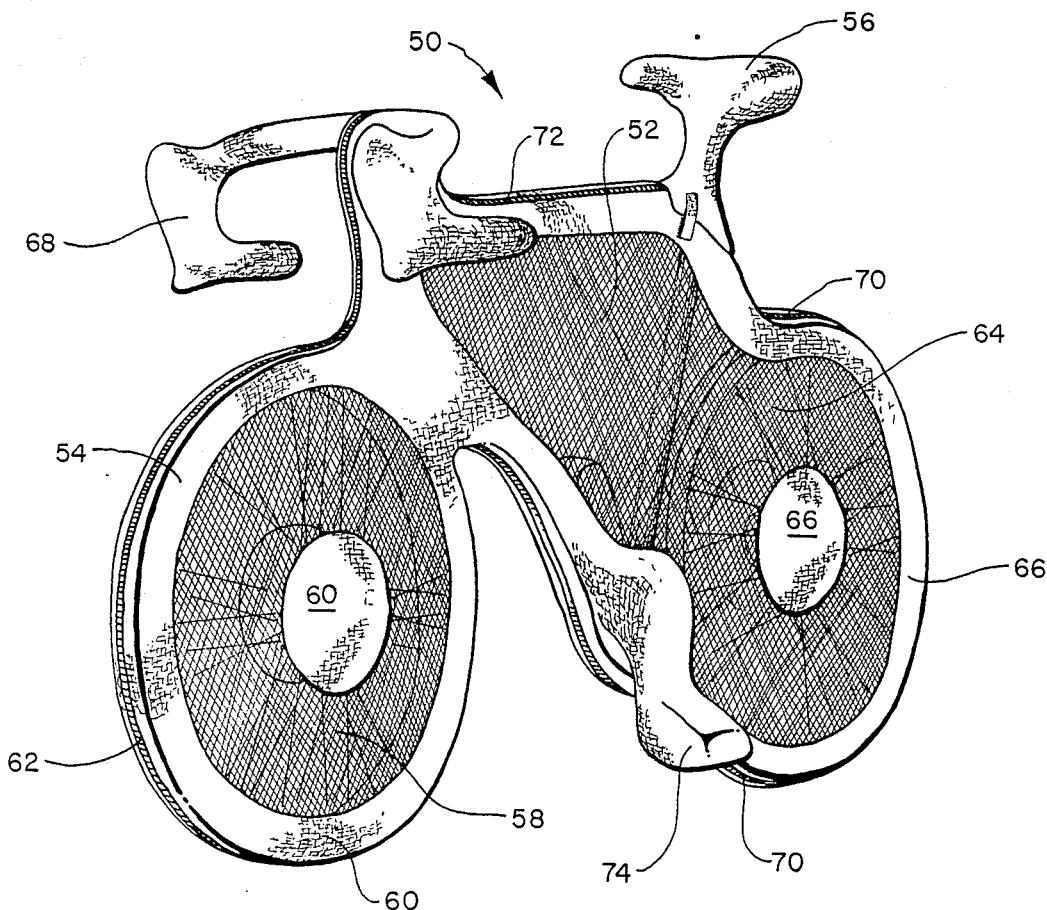
FIG. 3 is a side perspective view of an additional embodiment of the bicycle cover of the present invention.

An alternative embodiment of the present invention is illustrated in FIG. 3. The embodiment illustrated in FIG. 3 is structured in same general manner as the embodiment in FIG. 2, however, a larger portion of the cover is constructed of mesh. As with the cover 10 shown in FIGS. 1 and 2, the cover 50 is comprised of three separate pieces. These pieces include body 52, front wheel cover 54, and seat cover 56.

With reference to front wheel cover 54, the area represented generally by the spokes of the bicycle wheel is covered with mesh 58. At the same time, the areas generally represented by the hub, rim and tire of the wheel are covered with solid material 60. Again the diameter of front wheel cover 54 is at least partially circumscribed by a zipper 62. Zipper 62 covers a sufficient amount of the diameter of the front wheel that the wheel can be easily and conveniently loaded within front wheel cover 54.

The body 52 also comprises a combination of a significant quantity of mesh along with solid material. Mesh 64 included on the body 52 covers the areas generally represented by the interior of the bicycle frame and the area of the rear wheel represented by the spokes. Most of the frame, rear wheel hub, and rear rim are covered by solid material 66. The handle bars are preferably covered by elastic material 68 such that a snug and secure fit is achieved.

Again, it is presently preferred to include zipper 70 from near the base of the rear wheel to the area near the seat post. Zipper 72 continues from the seat post to the handle bar post. These zippers allow the bicycle to be easily positioned within the cover 50 and the cover 50 to be easily secured about the bicycle.

The embodiment of the device shown in FIG. 3 also includes separate pedal bags 74. These pedal bags 74 are preferably constructed of an elastic material such that a secure and snug fit can be achieved. Pedal bags 74 cooperate with the remainder of the device to assure that the bicycle is securely and completely covered.

In summary, the present invention provides an aerodynamic cover for use in transporting or storing a wheeled vehicle. The cover is specifically configured so that it "form fits" the bicycle or other vehicle. That is, the bicycle is covered without excessive bulk. This is in contrast to the bulky and baggy covers generally encountered in the existing art. By using elastic or stretch fabrics at various locations in the cover, an even tighter fit can be achieved. Locations where elastic material may preferably be used include the parts of the cover which enclose the seat, pedals and handle bars.

The use of mesh, or other type of structure that facilitates air flow, also helps the cover become aerodynamic. The mesh allows air to flow through the cover to minimize flapping of the cover. The cover, however, provides solid material over most of the important mechanical parts. Thus, adequate protection is provided by providing a very aerodynamic structure.

It will be appreciated that the cover can be used when transporting a bicycle or other vehicle by automobile. This is accomplished because of the aerodynamic profile presented by the covered bicycle. This is also facilitated by the flow through mesh used in the structure.

In summary, the present invention as described clearly meets the objects of the invention. The cover is form fit to the bicycle such that it presents an aerodynamic profile. This allows the cover to be used while transporting a bicycle by motor vehicle. In addition, air flow through the center of the cover is allowed by constructing at least a portion of the bag of a mesh material. This also facilitates the transportation of a bicycle by motor vehicle in that air is allowed to circulate through the cover.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An aerodynamic cover for a wheeled vehicle comprising:
    a structure of flexible material configured such that when in place over the wheeled vehicle it conforms generally to the outside silhouette of the wheeled vehicle;
    means for allowing placement of said wheeled vehicle within the structure of flexible material;
    means for securing the flexible structure about the wheeled vehicle such that the structure and the wheeled vehicle are generally aerodynamic; and
    at least one opening disposed through the cover and configured such that when a wheeled vehicle is placed within the cover, a sufficient quantity of air is capable of flowing through the cover such that the wheeled vehicle is capable of being transported on the outside of a motor vehicle, with the flapping of the cover being minimized.

2. An aerodynamic cover for a vehicle as defined in claim 1 wherein said means for allowing placement of the wheeled vehicle within the structure comprises at least two sections.

3. An aerodynamic cover for a vehicle as defined in claim 2 wherein the cover is formed of three sections.

4. An aerodynamic cover for a vehicle as defined in claim 3 wherein the sections comprise a body section, a seat cover, and a front wheel cover.

5. An aerodynamic cover for a vehicle as defined in claim 1 wherein the means for securing the flexible structure about the wheeled vehicle comprises at least one zipper.

6. An aerodynamic cover for a vehicle as defined in claim 4 wherein the means for securing the flexible structure about the wheeled vehicle comprises a zipper partially circumscribing the diameter of the front wheel cover.

7. An aerodynamic cover for a vehicle as defined in claim 4 wherein the means for securing the flexible structure about the wheeled vehicle comprises a zipper disposed on the body section such that the portion of the wheeled vehicle corresponding to the body section can be placed therein and secured inside the body section.

8. An aerodynamic cover for a vehicle as defined in claim 1 wherein said at least one opening is covered with a mesh material.

9. An aerodynamic cover for a vehicle as defined in claim 1 wherein said at least one opening is positioned such that it corresponds to an opening in the structure of the wheeled vehicle.

10. An aerodynamic cover for a vehicle as defined in claim 1 wherein at least a portion of the cover is constructed of an elastic material such that the cover tightly covers the wheeled vehicle.

11. A cycle cover for placement over a wheeled vehicle having a frame, at least one wheel, a seat, and pedals comprising:
    a solid piece of flexible material configured such that it generally covers the tire and rim of the wheel;
    a solid piece of flexible material configured such that it generally covers the frame;
    a solid piece of flexible material configured such that it generally covers the seat;
    a solid piece of flexible material configured such that it generally covers the pedals;
    means for securely placing said pieces about the wheeled vehicle; and
    means for attaching said pieces one with another such that an integral cycle cover is formed.

12. A cycle cover for placement over a wheeled vehicle as defined in claim 11 wherein said wheeled vehicle further comprises handle bars and wherein said cover further comprises a solid piece of flexible material configured such that it generally covers the handle bars.

13. A cycle cover for placement over a wheeled vehicle as defined in claim 12 wherein the means for attaching said pieces one with another comprises at least one additional piece of flexible material.

14. A cycle cover for placement over a wheeled vehicle as defined in claim 13 wherein said additional piece of flexible material comprises mesh such that air can pass through said additional piece of material.

15. A cycle cover for placement over a wheeled vehicle as defined in claim 11 wherein the at least one wheel further comprises a hub and wherein said cycle cover further comprises a piece of flexible material configured such that it covers said hub.

16. A cycle cover for placement over a wheeled vehicle as defined in claim 11 wherein the means for securely placing said pieces about the wheeled vehicle comprise at least one zipper.

17. A cycle cover for placement over a wheeled vehicle as defined in claim 16 wherein at least one zipper circumscribes at least a portion of the diameter of said solid piece configured such that it covers the wheel such that the wheel can be inserted into and removed from the cover.

18. An aerodynamic bicycle cover comprising:
- a first piece of flexible material configured such that the front wheel of a bicycle can be placed within said first piece;
- a second piece of flexible material configured such that the rear wheel, frame, and drive mechanism of the bicycle can be placed within said second piece;
- a third piece of flexible material configured such that the handle bars of the bicycle and be placed within said third piece; and
- a fourth piece of flexible material configured such that the seat of the bicycle can be placed within the fourth piece; and
- means for securely fastening said pieces around corresponding parts of the bicycle comprising at least one zipper; and
- means for allowing a sufficient volume of air to pass through at least a portion of said cover such that a wheeled vehicle placed within the cover is capable of being transported on the outside of a motor vehicle, with the flapping of the cover being minimized.

19. An aerodynamic bicycle cover as defined in claim 18 wherein said means for allowing air to pass comprises at least one opening disposed in said cover at a position such that the opening corresponds to an opening in the bicycle.

20. An aerodynamic bicycle cover as defined in claim 19 wherein said opening is covered with a mesh material.

* * * * *